United States Patent
Takahashi et al.

(10) Patent No.: US 6,953,538 B2
(45) Date of Patent: Oct. 11, 2005

(54) ELECTROCONDUCTIVE LOW THERMAL EXPANSION CERAMIC SINTERED BODY

(75) Inventors: Fumiaki Takahashi, Futtsu (JP); Tetsuro Nose, Futtsu (JP); Masashi Nakabayashi, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 259 days.

(21) Appl. No.: 10/296,516

(22) PCT Filed: Jun. 4, 2001

(86) PCT No.: PCT/JP01/04695

§ 371 (c)(1),
(2), (4) Date: Nov. 25, 2002

(87) PCT Pub. No.: WO01/94272

PCT Pub. Date: Dec. 13, 2001

(65) Prior Publication Data

US 2003/0139280 A1 Jul. 24, 2003

(30) Foreign Application Priority Data

Jun. 6, 2000 (JP) .................................. 2000-168437
Oct. 24, 2000 (JP) .................................. 2000-324518

(51) Int. Cl.[7] .......................... C04B 35/19; C03C 10/12; C03C 14/00; H01B 1/08

(52) U.S. Cl. ........................ 252/518.1; 252/519.2; 501/7; 501/18; 501/87; 501/88; 501/92; 423/326

(58) Field of Search ................... 252/518.1, 519.2, 252/502, 519.1; 501/7, 18, 87, 88, 92; 423/326, 445 R, 328.1, 406, 445, 439

(56) References Cited

U.S. PATENT DOCUMENTS

| 3,854,963 | A |   | 12/1974 | Rittler |
| 4,098,725 | A | * | 7/1978 | Yamamoto et al. ..... 252/520.21 |
| 5,001,086 | A | * | 3/1991 | Carrier et al. .................. 501/9 |
| 5,179,051 | A |   | 1/1993 | Bedard et al. |
| 6,372,677 | B1 | * | 4/2002 | Nose et al. .................. 501/119 |
| 2003/0100434 | A1 | * | 5/2003 | Yoshitomi et al. ............ 501/87 |
| 2003/0181310 | A1 | * | 9/2003 | Yamamoto et al. ......... 501/119 |

FOREIGN PATENT DOCUMENTS

| JP | 50-132017 |   | 10/1975 |   |
| JP | 53-47514 |   | 12/1978 |   |
| JP | 58-26075 | * | 2/1983 | ........... C04B/35/56 |
| JP | 60-37561 |   | 8/1985 |   |
| JP | 11-343168 |   | 12/1999 |   |
| JP | 2000-95559 |   | 4/2000 |   |
| JP | 2000-219752 | * | 8/2000 | ........... C04B/35/19 |

OTHER PUBLICATIONS

Gurland, J. "An Estimate of Contact and Continuity of Dispersions in Opaque Samples"; Transactions of the Metallurgical Society of AIME, vol. 236, May 1966, pp. 642–646.

* cited by examiner

Primary Examiner—Mark Kopec
Assistant Examiner—Kallambella Vijayakumar
(74) Attorney, Agent, or Firm—Kenyon & Kenyon

(57) ABSTRACT

An electroconductive low thermal expansion ceramic sintered body is disclosed which containing a β-eucryptite phase in a quantity of not less than 75 vol. % and not more than 99 vol. % and having an absolute value of thermal expansion coefficient of not more than $1.0 \times 10^{-7}$/K at a temperature of 0° C. to 50° C., a volumetric specific resistance of not more than $1.0 \times 10^7$ Ω·cm, and a specific rigidity of not less than 40 GPa/g/cm$^3$.

4 Claims, 1 Drawing Sheet

FIGURE
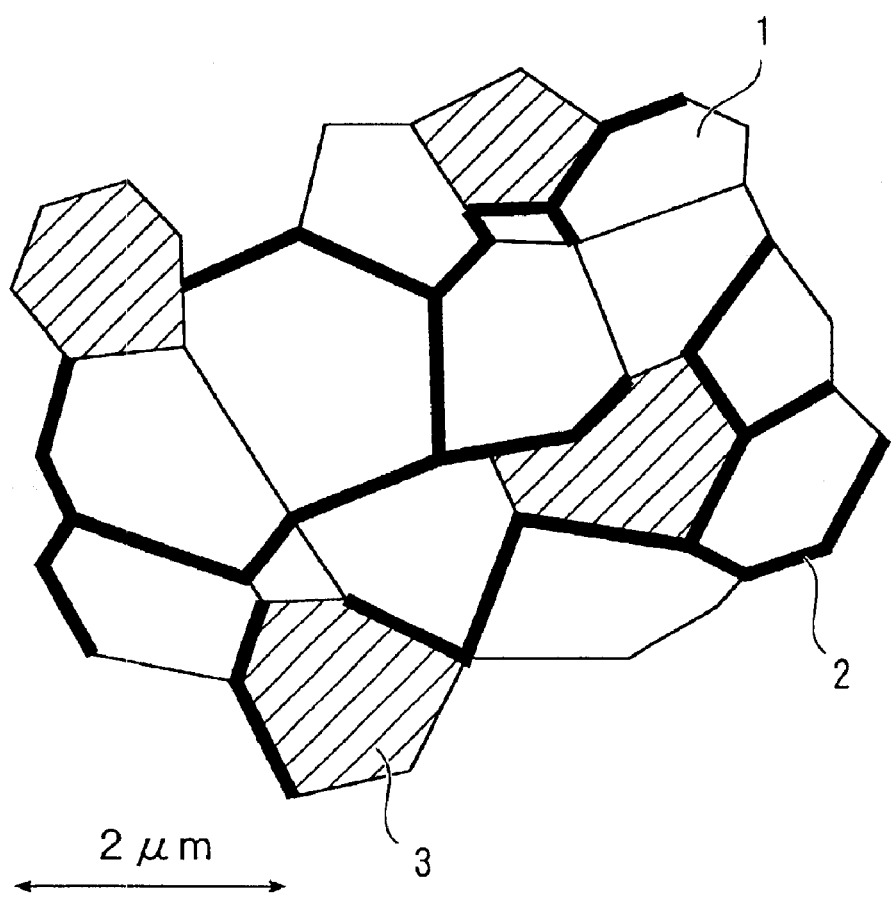
2 μm

ELECTROCONDUCTIVE LOW THERMAL EXPANSION CERAMIC SINTERED BODY

TECHNICAL FIELD

This invention relates to an electroconductive low thermal expansion ceramic sintered body and specifically to a ceramic to be used as the material for precision machine components.

BACKGROUND ART

In recent years, as the demand for higher precision in the field of precision processing technology has been mounting, it has been becoming important to warrant dimensional stability even for the materials to be used for the members forming precision processing machines. The materials for such members, therefore, have been becoming to require higher degrees of low thermal expansion property than ever attainable. They further require high specific rigidity for the purpose of enabling these members to attain reduction in weight and addition to resonance frequency. For such uses as dictate high cleanliness in the environment of actual service, the materials are required to exhibit electroconductivity sufficient for the purpose of preventing the members made thereof from being defiled by static electrification.

A review of the prior art from this point of view reveals the existence of metallic low thermal expansion materials represented by Invar and Super Invar, low thermal expansion glass, and various low thermal expansion ceramics such as cordierite, spodumene, and aluminum titanate as low thermal expansion materials.

Though Super Invar is characterized by exhibiting a relatively low thermal expansion coefficient of $1.3 \times 10^{-7}$/K at ordinary room temperature and high electroconductivity, it is handicapped by possessing marked low specific rigidity of less than 20 GPa/g/cm$^3$ as compared with ordinary ceramic materials. That is, the metallic low thermal expansion materials are extremely disadvantageous in terms of specific rigidity because they suffer from high specific gravity and relatively low Young's modulus as well.

Generally, ceramic materials are advantageous in terms of specific rigidity. As such a material, the low thermal expansion glass which has undergone a treatment for partial crystallization is disclosed in JP-A-50-132017 and in the catalog of Schott Corp. introducing its product sold under the trademark designation of "Zerodur." The ceramic material which has undergone a treatment of partial crystallization, owing to the coexistence therein of a crystalline part and a vitreous part having thermal expansion coefficients with different signs, realizes the low thermal expansion by counterbalancing the different thermal expansions of the two parts throughout the whole of the material. The low thermal expansion glass of this quality, however, is handicapped by lacking sufficient electroconductivity notwithstanding the thermal expansion coefficient thereof is practically nil at room temperature. The specific rigidity thereof is about 35 GPa/g/cm$^3$, a magnitude of which, though surpassing that of Super Invar, can hardly be rated as satisfactory.

The so-called low thermal expansion ceramics such as cordierite, spodumene, and aluminum titanate exhibits neither necessarily high specific rigidity nor fully sufficient electroconductivity.

In the technical field different from that of the present invention, the technique concerning the electroconductive low thermal expansion material that is aimed at providing a heater material enjoying exalted thermal shock properties has been in existence. The technique, however, is at a disadvantage in failing to impart fully satisfactorily low thermal expansion to the produced material.

JP-B-53-47514 and JP-B-60-37561, for example, disclose electroconductive low thermal expansion ceramics having an electroconductive substance dispersed in substances of a negative thermal expansion coefficient or a very small positive thermal expansion coefficient. The inventions of these publications are directed toward accomplishing low thermal expansion by dispersing a compound possessing a positive thermal expansion coefficient in the matrix formed of a compound possessing a negative or very small positive thermal expansion coefficient and thereby counterbalancing or lowering the mutual thermal expansions throughout the whole of the material. In this respect, these inventions have utilized the same technique disclosed in JP-A-50-132017 mentioned above. The inventions of JP-B-53-47514 and JP-B-60-37561, however, are directed toward a technique which is characterized by using as the compound to be dispersed in the matric phase a uniphase electroconductive substance and allowing at least part of this substance to continue and form a network throughout the whole of the material and thereby securing electroconductivity of the entire material. These ceramics, however, have failed, as demonstrated in examples cited in JP-B-53-47514, to realize satisfactorily low thermal expansivity because they require to disperse a large quantity of an electroconductive phase and, therefore, the absolute values of their thermal expansion coefficients are at least $4.2 \times 10^{-7}$/K, a markedly large magnitude as compared with the thermal expansion coefficient of Super Invar.

Generally, since an electroconductive substance has a large thermal expansion coefficient, a matrix containing an electroconductive phase in a large ratio cannot realize a low thermal expansion property. If this matrix conversely has a small electroconductive phase content, it will be unable to acquire satisfactory electroconductivity. JP-B-53-47514, for example, cites an example which demonstrates the dependency of specific resistance and thermal expansion coefficient on the quantity of the electroconductive material incorporated in the material. The results of this example deny that such satisfactory electroconductivity and low thermal expansion properties are at present simultaneously fulfilled.

The technique which, as disclosed in JP-B-53-47514, secures electroconductivity of the whole material by incorporating an electroconductive phase in a matric phase which is an insulating material, causing at least part of the electroconductive phase to be dispersed in a continued state, and thereby forming a network of the electroconductive phase throughout the whole of the material. Gurland's report (Gurland, J., 1966, Trans. Metals Soc. AIEM, vol. 236, 642) is available for referential use. According to this report, as demonstrated by an experiment in a Bakelite-silver particles system, when the quantity of the electroconductive substance is not less than about 30% by volume, the electroconductive substance dispersed in the insulating material attains thorough mutual contact enough to realize electroconductivity of the whole material. It is extremely difficult for the reason stated above to realize a satisfactorily low thermal expansion property with the quantity of the electroconductive substance set in the neighborhood of this volumetric ratio. No case of succeeding in realizing this property has ever been reported to literature.

Even the invention of JP-B-60-37561, which utilizes a technique similar to the technique of JP-B-53-47514, requires a substance of low thermal expansion coefficient to incorporate therein not less than 25% by volume of an electroconductive phase and, consequently, fails to realize low thermal expansion in addition to securing satisfactory electroconductivity.

The addition of carbon black to a material of low thermal expansion is possibly used, as mentioned in JP-A-11-343168, as a means for blackening the material with the object of imparting a sunproofing property. Though carbon black exhibits electroconductivity, the sole addition of carbon in the quantity specified in the specification to cordierite does not result in acquiring such satisfactory electroconductivity as mentioned above.

The task which this invention aims to fulfill, therefore, resides in solving the problems confronting the prior art and providing a material of low thermal expansion which exhibits high specific rigidity and satisfactory electroconductivity as well with a view to realizing such precision machine members as demand a high degree of cleanliness and enjoy light weight and high dimensional accuracy.

DISCLOSURE OF THE INVENTION

We have found that the task mentioned above is fulfilled by a composite ceramic sintered body having carbon or a compound containing carbon other than SiC, and TiN or SiC particles simultaneously dispersed in a β-eucryptite type ceramic capable of negative thermal expansion and further having a fine texture thereof optimized. They have consequently perfected this invention.

Specifically, this invention concerns a ceramic sintered body capable of high specific rigidity, electroconductivity, and low thermal expansion, which is characterized by containing not less than 75% by volume and not more than 99% by volume of a β-eucryptite phase and filling the balance less the β-eucryptite phase with carbon or a compound containing carbon other than SiC (hereinafter abbreviated as "carbon compound") and TiN or SiC particles, and having a thermal expansion coefficient of the absolute value of not more than $1.0 \times 10^{-7}/K$ at a temperature in the range of 0° C.–50° C., a volumetric specific resistance of not more than $1.0 \times 10^7$ Ω·cm, and a specific rigidity of not less than 40 GPa/g/cm$^3$. This sintered body contains 0.5–4% by volume of a carbon compound and 0.5–12% by volume of TiN particles or 6–24.5% by volume of SiC particles. It is characterized by the β-eucryptite phase having an average particle diameter in the range of 0.5–5 μm and the TiN particles having an average particle diameter in the range of 0.5–3 μm or the SiC particles having an average particle diameter in the range of 0.2–3 μm. Further, this electroconductive low thermal expansion ceramic sintered body has a textural structure in which the TiN or SiC particles are discretely dispersed, further the carbon compound exists as a grain boundary phase in at least part of the β-eucryptite phase and/or the grain boundary of the TiN particles or the SiC particles, and the average thickness of the grain boundary and the grain boundary phase in the vertical direction is not more than 10% of the average crystal particle diameter of the β-eucryptite.

BRIEF DESCRIPTION OF THE DRAWINGS

FIGURE depicts a typical fine structure of an electroconductive low thermal expansion ceramic sintered body contemplated by this invention.

BEST MODE FOR CARRYING OUT THE INVENTION

In the process for the production of a semiconductor, which requires a processing technique of the highest precision, it has been becoming essential for the positioning to be effected with high precision of not more than 100 nm. For the purpose of improving the throughput, the supporting member for a semiconductor producing device must be moved at a high speed to a place prescribed for the positioning.

The thermal expansion of any of the members of a semiconductor-producing device forms a major factor for the degradation of precision. When a member having a thermal expansion coefficient of $10 \times 10^{-7}/K$ and measuring 500 mm in size is subjected to a change of 1° C. in its temperature, it gives rise to such a deviation as 500 nm in the terminal surface thereof. To preclude such an influence as this, the absolute value of the thermal expansion coefficient of this member is required to be limited to not more than $1.0 \times 10^{-7}/K$.

Further, the supporting member generates vibration in consequence of the movement thereof at a high speed and this vibration forms a factor for lowering precision and reducing a throughput. From the point of view of curbing this vibration, the member is required to exhibit greater specific rigidity than the existing low thermal expansion glass. Particularly, this specific rigidity is required to be not less than 40 GPa/g/cm$^3$.

Further, the member is also required to possess satisfactory electroconductivity for the purpose of preventing the member from being defiled by electrization. The term "satisfactory electroconductivity" as used herein refers to such electroconductivity as realizes a volumetric specific resistance of not more than $1.0 \times 10^7$ Ω·cm.

The electroconductive low thermal expansion ceramic contemplated by this invention contains mainly a β-eucryptite phase for the following reason. The sintered body is required to have the matrix phase thereof formed of a compound of negative thermal expansion for the purpose of obtaining a ceramic sintered body of low thermal expansion. As examples of the compound mentioned above, β-eucryptite phase, aluminum titanate, spodumene, and cordierite may be cited. Only when the β-eucryptite, which exhibits a large negative thermal expansion among them, is used for the matric phase, such low thermal expansion property, electroconductivity, and specific rigidity as are aimed at can be attained.

The term "β-eucryptite phase" as used herein means a ceramic such as a composition of this molar ratio, $Li_2O:Al_2O_3:SiO_2=0.8–1.2:0.8–1.2:1.6–2.4$.

The reason for selecting TiN or SiC as a dispersing substance is that this substance is capable of heightening the specific rigidity of a complex ceramic to be produced. Even when an electroconductive high-rigidity substance such as WC is utilized as the dispersion particle, it is difficult to attain low thermal expansion and high specific rigidity at the same time.

In order that the ceramic contemplated by this invention may secure low thermal expansion property, electroconductivity, and high specific rigidity all at once, it is required to contain TiN or SiC particles and the carbon compound at the same time. If these two components are contained independently, the expected properties mentioned above will not be attained even when the content of the TiN or SiC particles or the carbon compound falls in the specified range. In the preferred embodiment of the present invention, the sintered body contains 0.5–4% by volume of the carbon compound and 0.5–12% by volume of the TiN particles or 6–24.5% by volume of the SiC particles. The quantities in these ranges represent preferred contents of the relevant components for the sake of realizing such thermal expansion coefficient, volumetric resistivity, and specific rigidity specified by this invention. Only by an adequate combination of the quantity of the carbon compound and the quantity of the TiN particles or the quantity of the SiC particles falling in the relevant ranges specified above, the target physical constants of this invention are attained. The absolute value of the thermal expansion coefficient of the sintered body exceeds $1.0 \times 10^{-7}/K$ when the content of TiN particles falls short of 0.5% by volume or exceeds 12% by volume or the content of SiC particles falls short of 6% by volume or exceeds 24.5% by volume. Thus, any deviation of such content from the specified range is unfavorable. Particularly when the content of the TiN particles or the content of the SiC particles falls short of 0.5% by volume or 6% by volume respectively, the object of this invention is not attained because the specific rigidity also falls short of 40 $GPa/g/cm^3$. When the content of the carbon compound is smaller than 0.5% by volume, the thermal expansion coefficient is not affected. When it is larger than 4% by volume, however, it becomes difficult to attain the target low thermal expansion coefficient. As regards the electroconductivity, no sufficient electroconductivity is secured when the content of the carbon compound and the content of TiN particles or the content of SiC particles are smaller than the respectively prescribed quantities. Further, as regards the content of the carbon compound, if this content exceeds 4% by volume, the excess will result in inhibiting the ceramic from being sintered, lowering the elastic modulus of the sintered body, and confining the specific rigidity below 40 $GPa/g/cm^3$. The content exceeding 4% by volume, therefore, is unfavorable because it does not conform to the object of this invention.

The average crystal particle diameter of the β-eucryptite phase ought to assume a magnitude in the range of 0.5–5 μm and that of the TiN particles and that of the SiC particles respectively a magnitude in the range of 0.5–3 μm and a magnitude in the range of 0.2–3 μm. When these magnitudes deviate from the respective ranges, satisfactory electroconductivity and low thermal expansion property cannot be simultaneously realized. It is necessary that the carbon compound be present as a grain boundary phase in the grain boundary of the β-eucryptite phase and the TiN particles or the SiC particles and the average thickness of the grain boundary phase in the direction perpendicular to the grain boundary be not more than 10% of the average crystal particle diameter of the β-eucryptite. If the average thickness exceeds this size, it will become impossible to obtain satisfactory electroconductivity.

FIGURE is a diagram portraying the typical fine texture of an electroconductive low thermal expansion ceramic according to this invention. The fine texture is characterized by the fact that TiN or SiC particles 3 are dispersed discretely therein and further the carbon compound 2 is present as a grain boundary phase in at least part of the β-eucryptite phase 1 and/or the grain boundary of TiN or SiC particles 3. The preceding expression that the particles are discretely dispersed in the fine texture describes the fact that TiN or SiC particles 3 are not mutually contacting to form a chain-like network. The statement that the carbon compound 2 is present in the β-eucryptite phase 1 and in the grain boundary of the TiN or SiC particles 3 describes the fact that the carbon compound is present with a certain thickness in the grain boundary. This thickness relative to the direction perpendicular to the crystal grain boundary of the β-eucryptite is preferred to be not more than 10% of the average crystal particle diameter of the β-eucryptite. The statement that the carbon compound is present with a certain thickness in the grain boundary describes the fact that the carbon compound is present contiguously in the form of independent particles to the β-eucryptite phase and the grain boundary of the TiN or SiC particles or the fact that the carbon compound is in such a situation as entrains segregation of carbon in the neighborhood of grain boundary of crystal particles having an average particle diameter. For the purpose of deciding the volumetric ratio of individual particles or a compound in a given material, the method which determines this volumetric ratio by cutting the material in an arbitrary plane, measuring area radios of the individual particles appearing in the cut plain, and performing a necessary calculation using the measured area ratios may be utilized. Otherwise, when the volumetric change occurring after the calcination is considered to be negligible, the volumetric ratio maybe found from the weight-mixing ratio of components of the raw material powder and the density of each of the components.

The novel point of the material contemplated by this invention consists in enabling the carbon compound to exist in the form of a thin layer in the β-eucryptite phase and in the grain boundary of the TiN or SiC particles and secure electroconductivity despite the addition of an electroconductive substance in such a small quantity, as has been heretofore unattainable, by adding the carbon compound and the TiN or SiC particles together in the form of a composite and restricting both the quantities thereof so added and the fine texture of the sintered body, and in realizing such high specific rigidity, as has never been attained by the conventional low thermal expansion material, by selecting either TiN or SiC as the material for the dispersing particles. That is, this invention makes it possible by utilizing the carbon compound as an electroconductive grain boundary phase to secure sufficient electroconductivity in spite of the presence of an electroconductive phase in an extremely small quantity as compared with the conventional countertype. Further, the presence of the TiN or SiC particles having a specified particle diameter also contributes to the realization of the electroconductivity in consequence of the addition of such particles in the quantity prescribed by this invention. Specifically, for the purpose of acquiring the electroconductivity solely with the grain boundary phase of the carbon compound, the volumetric ratio of the carbon compound would surpass markedly the quantity specified by this invention. The presence of the TiN or SiC particles, however, enables the volumetric ratio of the carbon compound to be effectively lowered.

The carbon compound is not particularly restricted on account of the sort of form but required to be such a substance as survives in the form of an electroconductive substance or varies during the course of calcining the ceramic. As examples of the carbon compound, carbon black, graphite, and titanium carbide may be preferably cited. Among them, the carbon black proves particularly favorable.

According to this invention, by forming a low thermal expansion ceramic comprising the β-eucryptite phase as a main component and further incorporating therein TiN particles or SiC particles and a carbon compound, it is possible to secure the electroconductivity in spite of the addition of an electroconductive substance in a markedly small quantity as compared with the prior art and thereby realize a material of such high specific rigidity, electroconductivity, and low thermal expansion as have never been attained heretofore.

The ceramic sintered body contemplated by this invention has a composition comprising the β-eucryptite mainly and is formed by the ordinary powder sintering. With the object of attaining compaction of the texture more effectively, such a sintering method as hot press or hot isostatic press may be utilized. Here, the carbon compound and the TiN particles or the SiC particles must exist in the forms mentioned above in the fine texture of the ceramic sintered body.

To manufacture the ceramic described above, first lithium oxide, aluminum oxide, and silicon oxide are weighed out in such quantities as form a eucryptite composition and further a TiN powder or a SiC powder and a carbon compound are weighed out in prescribed quantities and they are mixed together in a ball mill to produce a mixed powder. Here, the sources for lithium, aluminum, and silicon are not particularly restricted. Spodumene, petalite, lithium carbonate, etc. may be utilized in a combination thereof. The known raw materials containing lithium, aluminum, and silicon may be suitably selected and used herein. The carbon compound to be used herein is not particularly restricted on account of factors such as form and origin. Carbon black and graphite may be added. The residual carbon of the binder used in the raw material powder, the type of carbon addable during the course of process, and a compound containing carbon may be utilized. Among them, the carbon black may be particularly selected as an inexpensive and optimum raw material.

As the raw material, the TiN powder is preferred to have an average particle diameter in the range of 0.5–3 µm and the SiC powder an average particle diameter in the range of 0.2–3 µm. If the average particle diameter deviates from this range, it will become difficult to realize a low thermal expansion property and satisfactory electroconductivity at the same time. When the carbon source for the carbon compound is secured by the use of an additive, the particle diameter of the raw material of this additive forms an important factor. This particle diameter must be as small as permissible. Particularly when the primary particle diameter is not more than 50 nm, especially not more than 20 nm, the material texture for the sintered body aimed at by this invention can be realized. If the primary particle diameter of the raw material for the carbon compound exceeds 0.5 µm, the excess will result in rendering it difficult to obtain the satisfactory electroconductivity with stability. As means to determine the particle diameter of the raw material, known methods such as those which effect the determination by means of a laser scattering or specific surface area may be utilized.

The mixed powder thus obtained is formed in a required shape by a means such as a molding press and an isostatic press and then calcined. Otherwise, the powder may be placed in a die, pressed, and calcined as in the case of a hot press. Other known methods in popular use are also available. The formation is not limited to the methods cited above.

As respects the conditions for the calcination, the temperature is not lower than 1000° C. and not higher than 1420° C., preferably not lower than 1250° C. and not higher than 1400° C. and the atmosphere is formed of oxygen of a concentration of not more than 1000 ppm and preferably formed of an inert gas such as nitrogen or argon of a concentration of not more than 100 ppm. If the temperature deviates from the range specified above, the deviation will result in preventing the β-eucryptite phase from being formed with stability and rendering it impossible to attain electroconductivity and a low thermal expansion property at the same time. The sintering resorting to the hot press or the hot isostatic press proves advantageous for the purpose of attaining the compaction more effectively. The pressure to be used by such a press for the compaction proves effective when it exceeds 10 MPa. The calcination temperature and the calcination atmosphere used for the compaction are the same as those described above.

Now, this invention will be more specifically described below with reference to examples. This invention is not limited by such illustrations.

EXAMPLES 1–5 AND COMPARATIVE EXAMPLES 1–6

In a ball mill, were mixed 24.3 parts by weight of lithium carbonate (average particle diameter 2.2 µm), 34.2 parts by weight of aluminum oxide (average particle diameter 0.6 µm), and 41.5 parts by weight of silicon oxide (average particle diameter 0.8 µm). The powder consequently formed was recovered and then calcined in the atmospheric air at 1300° C. The calcined powder and TiN particles of an average primary particle diameter of 3 µm and carbon black of an average primary particle diameter of 20 nm were added together, pulverized in a ball mill, and mixed till a mixed powder of satisfactorily uniform composition was formed. The mixed powder thus obtained was calcined with a hot press in the atmosphere of nitrogen at a temperature of 1320° C.–1370° C. under a pressure of 20 MPa. The quantities of the carbon black and the TiN particles were so adjusted as to form a composition indicated in Table 1 after calcination. The volumetric ratios shown in Table 1 were found from the observation of an image under a transmission electron microscope (TEM) and the EDX analysis. Comparative Example 6 was performed by following the procedure described above, except that graphite having an average particle diameter of 2.1 µm was used instead of carbon black.

The texture of the sintered body thus obtained was composed of a β-eucryptite phase having an average crystal particle diameter of 0.5–5 µm and TiN particles having an average particle diameter of 0.5–3 µm. In the experiments except for Comparative Examples 4 and 6, the EDX analysis with a TEM detected inspissation of carbon in the form of a grain boundary phase in the grain boundary of at least part of the particles mentioned above in the region of not more than 10% of the average crystal particle diameter of the β-eucryptite phase. There were, in Comparative Example 6, numerous carbon particles having particle diameters exceeding 1 µm in the sintered body. The properties of the produced sintered bodies are shown in Table 1. It is clear from the data of examples given in Table 1 that it was possible to satisfy the thermal expansion coefficient, specific resistivity, and specific rigidity by confining the composition of a sintered body within the range specified by this invention. In contrast, in Comparative Example 1, the expected thermal expansion coefficient was not obtained because of unduly large quantity of TiN. In Comparative Example 2, the expected properties were also not obtained at all because no TiN was added and the quantity of the carbon compound was unduly large. In Comparative Example 3, the absolute value of thermal expansion coefficient was large and the specific rigidity was low because the quantity of TiN was not sufficient and the quantity of the carbon compound was unduly large. In Comparative Example 4, the properties other than the specific rigidity were not satisfied because the quantity of TiN was unduly large and no carbon compounds were contained. In Comparative Example 5, the specific rigidity was markedly low and the absolute value of thermal expansion coefficient failed to reach the target level because the quantity of the carbon compound was unduly large. In Comparative Example 6, the properties other than the absolute value of thermal expansion coefficient were not satisfied because the fine texture of the sintered body specified by this invention was not realized.

TABLE 1

| | Composition (vol. %) | | | Properties | | |
|---|---|---|---|---|---|---|
| | β-eucrytite | TiN | Carbon compound | Absolute value of thermal expansion coefficient ($\times 10^{-7}$/K) | Specific resistivity ($\times 10^7 \Omega \times$ cm) | Specific rigidity (GPa/g/cm$^3$) |
| Example 1 | 97.2 | 0.8 | 2 | 0.5 | 0.87 | 45 |
| Example 2 | 97 | 2 | 1 | 0.1 | 0.56 | 47 |
| Example 3 | 91 | 8 | 1 | 0.08 | 0.21 | 48 |
| Example 4 | 89 | 8 | 3 | 0.5 | 0.13 | 47 |
| Example 5 | 87 | 10 | 3 | 0.8 | 0.062 | 49 |
| Com. Example 1 | 79 | 18 | 3 | 5.1 | 0.021 | 51 |
| Com. Example 2 | 82 | 0 | 18 | 2.1 | 5.5 | 29 |
| Com. Example 3 | 82.7 | 0.3 | 17 | 1.5 | 0.9 | 31 |
| Com. Example 4 | 80 | 20 | 0 | 8.9 | 81 | 49 |
| Com. Example 5 | 81 | 10 | 9 | 1.8 | 0.082 | 34 |
| Com. Example 6 | 79 | 8 | 13 | 0.7 | 5.3 | 38 |

EXAMPLES 6–10 AND COMPARATIVE EXAMPLES 7–12

In a ball mill, were mixed 25.0 parts by weight of lithium carbonate (average particle diameter 2.2 μm), 34.4 parts by weight of aluminum oxide (average particle diameter 0.6 μm), and 40.6 parts by weight of silicon oxide (average particle diameter 0.8 μm). The powder consequently formed was recovered and then calcined in the atmospheric air at 1300° C. The calcined powder and SiC particles of an average primary particle diameter of 0.7 μm and carbon black of an average primary particle diameter of 20 nm were added together, and pulverized in a ball mill to form a mixed powder of satisfactorily uniform composition. The mixed powder thus obtained was calcined in the atmosphere of nitrogen at a temperature of 1300° C.–1370° C. The quantities of the carbon black and the SiC particles were so adjusted as to form a composition indicated in Table 2 after calcination. The volumetric ratios shown in Table 2 were found from the observation of an image under a TEM and the EDX analysis. Comparative Example 12 was performed by following the procedure described above, except that graphite having an average particle diameter of 2.1 μm was used instead of carbon black.

The texture of the sintered body thus obtained was composed of a β-eucryptite phase having an average crystal particle diameter of 0.5–5 μm and SiC particles having an average particle diameter of 0.2–3 μm. In the experiments except for Comparative Examples 7–9 and 12, the EDX analysis with a TEM detected inspissation of carbon in the form of a grain boundary phase in the grain boundary of at least part of the particles mentioned above in the region of not more than 10% of the average crystal particle diameter of the β-eucryptite phase. In Comparative Example 12, there were numerous carbon particles having particle diameters exceeding 1 μm in the sintered body. The properties of the produced sintered bodies are shown in Table 2. It is clear from the data of examples given in Table 2 that it was possible to satisfy the thermal expansion coefficient, specific resistivity, and specific rigidity by confining the composition of a sintered body within the range specified by this invention. In contrast, in Comparative Example 7, the thermal expansion and the specific rigidity did not have expected magnitudes because of unduly small quantity of SiC. In Comparative Example 8, the absolute value of thermal expansion coefficient was larger than the target magnitude because of unduly large quantity of SiC. In Comparative Example 9, the thermal expansion and the specific rigidity reached the target magnitudes. In Comparative Examples 7–9, however, the expected specific resistivity was not obtained invariably because no carbon compound was contained. In Comparative Example 10, the expected properties were not obtained at all because no SiC was added. In Comparative Example 11, the absolute value of thermal expansion coefficient was large and the specific rigidity was low because the quantity of SiC was not sufficient and the quantity of the carbon compound added was unduly large. In Comparative Example 12, the expected specific resistivity was not obtained because the fine texture of the sintered body specified by this invention was not realized.

TABLE 2

| | Composition (vol. %) | | | Properties | | |
|---|---|---|---|---|---|---|
| | β-eucryptite | SiC | Carbon compound | Absolute value of thermal expansion coefficient ($\times 10^{-7}$/K) | Specific resistivity ($\times 10^7 \Omega \times$ cm) | Specific rigidity (GPa/g/cm$^3$) |
| Example 6 | 88 | 8.5 | 3.5 | 0.7 | 0.87 | 51 |
| Example 7 | 84 | 14.5 | 1.5 | 0.5 | 0.75 | 57 |
| Example 8 | 82 | 16.7 | 1.3 | 0.3 | 0.61 | 58 |
| Example 9 | 80 | 19 | 1 | 0.2 | 0.08 | 60 |
| Example 10 | 76 | 23.2 | 0.8 | 0.8 | 0.06 | 62 |
| Comp. Example 7 | 95 | 5 | 0 | 2.6 | 181 | 46 |
| Comp. Example 8 | 70 | 30 | 0 | 3.1 | 26 | 66 |

TABLE 2-continued

|  | Composition (vol. %) | | | Properties | | |
| --- | --- | --- | --- | --- | --- | --- |
|  | β-eucryptite | SiC | Carbon compound | Absolute value of thermal expansion coefficient ($\times 10^{-7}$/K) | Specific resistivity ($\times 10^7 \Omega \times$ cm) | Specific rigidity (GPa/g/cm$^3$) |
| Comp. Example 9 | 80 | 20 | 0 | 0.1 | 62 | 62 |
| Comp. Example 10 | 96 | 0 | 4 | 3.3 | 94 | 39 |
| Comp. Example 11 | 86.5 | 3 | 10.5 | 1.2 | 18 | 31 |
| Comp. Example 12 | 78 | 21 | 1 | 0.4 | 7.2 | 47 |

INDUSTRIAL APPLICABILITY

As described in detail above, the electroconductive low thermal expansion ceramic contemplated by this invention realizes a material for precision machine components which enjoy light weight and high dimensional stability and befit use in an environment demanding high cleanliness.

What is claimed is:

1. An electroconductive low thermal expansion ceramic sintered body comprising:

a β-eucryptite phase in a quantity of not less than 75% by volume and not more than 99% by volume;

carbon or a compound containing carbon other than SiC in the range of 0.5 to 4% by volume; and a TiN particle content in the range of 0.5 to 12% by volume or a SiC particle content in the range of 6 to 24.5% by volume, a total amount of the β-eucryptite phase, the carbon or carbon compound and the TiN particle content or SiC particle content being 100% by volume;

wherein an absolute value of thermal expansion coefficient thereof is not more than $1.0 \times 10^{-7}$/K at a temperature in the range of 0° C. to 50° C., a volumetric specific resistance thereof is not more than $1.0 \times 10^7$ Ω·cm, and a specific rigidity thereof is not less than 40 GPa/g/cm$^3$.

2. A ceramic sintered body according to claim 1, wherein an average particle diameter of said β-eucryptite phase is in the range of 0.5 to 5 μm, an average particle diameter of said TiN particles is in the range of 0.5 to 3 μm, and an average particle diameter of said SiC particles is in the range of 0.2 to 3 μm.

3. A ceramic sintered body according to claim 1, wherein a textural structure of said sintered body has TiN or SiC particles dispersed discretely therein and has the carbon or the compound containing carbon other than SiC formed as a grain boundary phase in at least part of the grain boundary of said β-eucryptite phase and/or said TiN or SiC particles.

4. An electroconductive low thermal expansion ceramic sintered body, comprising a β-eucryptite phase in a quantity of not less than 75% by volume and not more than 99% by volume, wherein an absolute value of thermal expansion coefficient thereof is not more than $1.0 \times 10^{-7}$/K at a temperature in the range of 0° C. to 50° C., a volumetric specific resistance thereof is not more than $1.0 \times 10^7$ Ω·cm, and a specific rigidity thereof is not less than 40 GPa/g/cm$^3$;

wherein a textural structure of said sintered body has TiN or SiC particles dispersed discretely therein and has carbon or a compound containing carbon other than SiC formed as a grain boundary phase in at least part of the grain boundary of said β-eucryptite phase and/or said TiN or SiC particles; and wherein an average thickness of said grain boundary phase in the direction perpendicular to said grain boundary is not more than 10% of an average crystal particle diameter of said β-eucryptite.

* * * * *